Oct. 2, 1934.  E. E. WEMP  1,975,185
CENTRIFUGAL CLUTCH
Filed Dec. 4, 1931  2 Sheets-Sheet 1

INVENTOR.
ERNEST E. WEMP.
BY Barnes and Kisselle
ATTORNEYS.

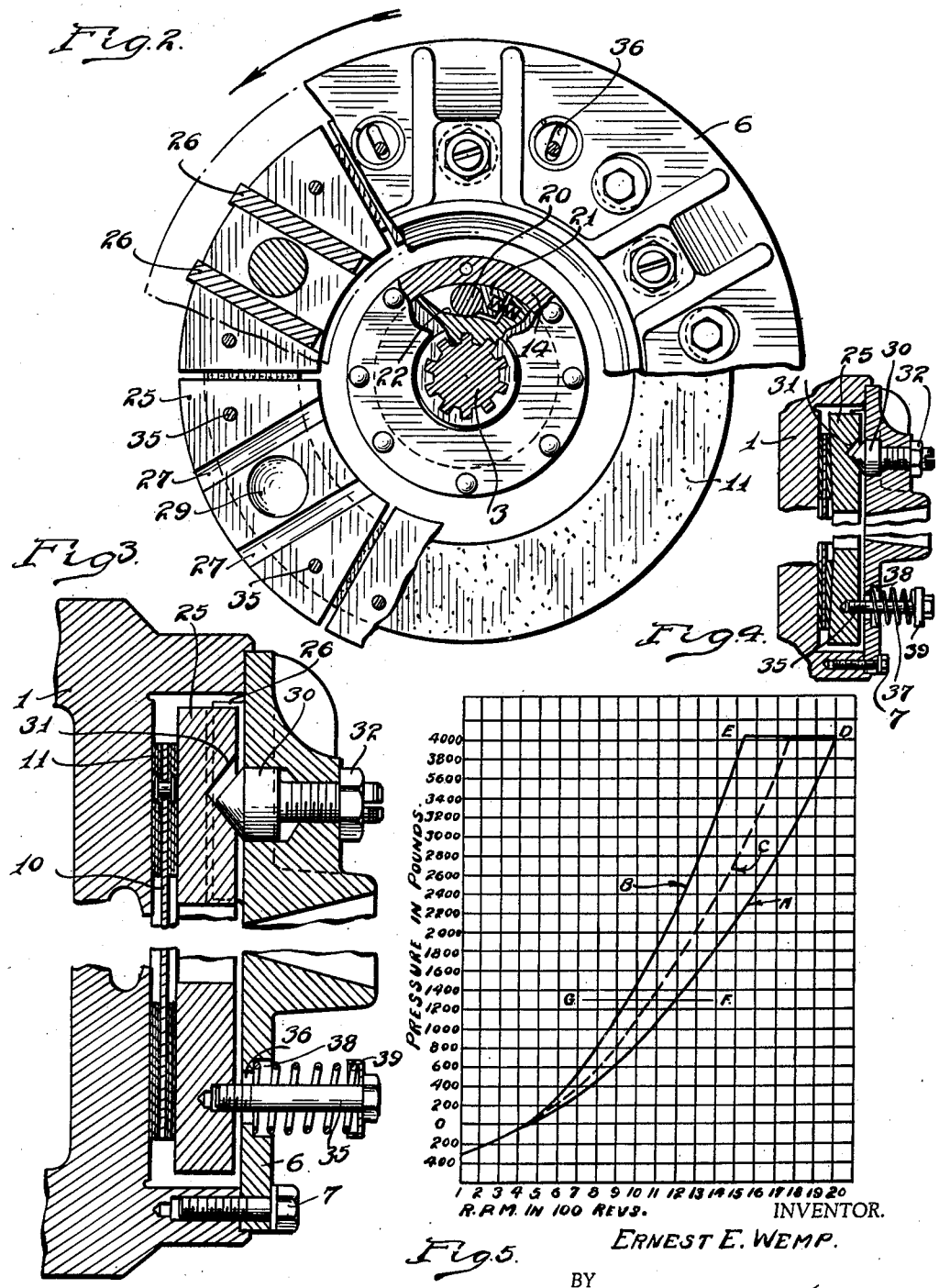

Patented Oct. 2, 1934

1,975,185

UNITED STATES PATENT OFFICE 1,975,185

CENTRIFUGAL CLUTCH

Ernest E. Wemp, Detroit, Mich.

Application December 4, 1931, Serial No. 578,988

6 Claims. (Cl. 192—48)

This invention has to do with a clutch, and it is particularly directed toward the provision of a clutch operable by centrifugal action. Such a clutch is useful in automotive vehicles and the same is described herein in such an environment, but it will be obvious that the clutch may be employed elsewhere than in automotive vehicles.

One of the principal objects of the invention is the provision of a centrifugal clutch wherein a certain torque capacity provided by the clutch may, in one instance, occur at a relatively high R. P. M. while the same or substantially the same torque capacity may occur, in another instance, at a relatively low R. P. M. Ordinarily, centrifugal force varies in proportion to the speed of rotation so that with a given clutch of centrifugal type the torque capacity produced at a given R. P. M. would be substantially the same both upon acceleration and upon deceleration, with possible variations due to inefficient mechanical operation. In accordance with the present invention a centrifugal clutch is provided wherein during acceleration and during deceleration a given torque capacity is afforded at different R. P. M. to the end that such given torque capacity may be provided over a range of speeds.

Centrifugal force may effect initial clutch engagement at a relatively low R. P. M., but such engagement is not effected with great pressure, and the torque capacity is low. In a given automotive vehicle, or under other given conditions elsewhere than in an automotive vehicle where power is to be transmitted, the torque capacity of a clutch should be sufficient to take care of the maximum power out-put or torque delivered by an engine or driving means. This may be termed the minimum desired torque capacity for the maximum power out-put, and is attained, in a centrifugal clutch, at a R. P. M. higher than the R. P. M. of initial engagement. The above will be true with uncontrolled centrifugal action. There are times when the maximum power output or torque delivered by the engine may occur at an R. P. M. which is lower than the R. P. M. necessary to produce the minimum desired torque capacity in a centrifugal clutch. The present invention contemplates a clutch which will maintain the relatively high torque capacity at an R. P. M. lower than that speed required to produce such torque capacity. More specifically a controlling action upon the centrifugal action is introduced. The purposes of this will be appreciated as the detailed description progresses.

Other objects of the invention reside in the provision of a simplified structure wherein parts are minimized and wherein, more specifically, centrifugal members function also as pressure plates or pressure rings in a clutch.

In the accompanying drawings:

Fig. 2 is a view partly in section and with parts cut away looking substantially in the direction of the arrows 2—2 of Fig. 1.

Fig. 3 is a view illustrating the position of some of the parts in Fig. 1 in clutch engagement.

Fig. 4 is a view similar to Fig. 3 illustrating a modified form of the invention.

Fig. 5 is a diagram illustrating the operation.

Figure 1:
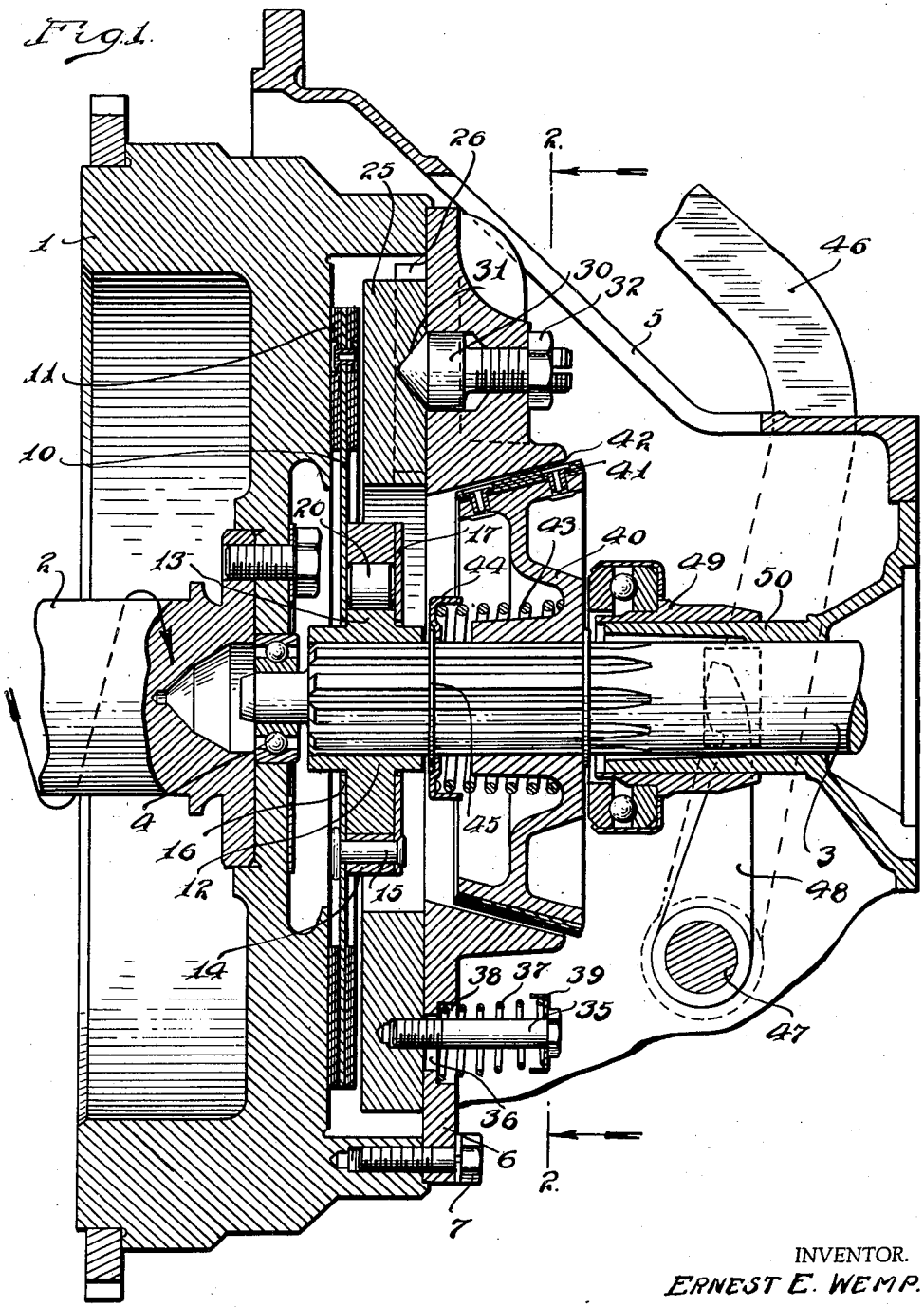
Fig. 1 is a sectional view taken through a clutch constructed in accordance with the invention.

As above set forth the invention is shown and described in the environment of an automotive vehicle. Accordingly, the flywheel of an internal combustion engine is shown at 1 mounted upon the end of an engine crank shaft 2. A driven shaft is illustrated at 3 and the same may be journaled in a pilot bearing 4. The usual clutch housing is illustrated at 5.

A cover plate as illustrated at 6 may be attached to the flywheel as by means of cap screws 7, and this cover plate houses, together with the flywheel, certain of the clutch elements. First considering the driven clutch element; this may consist of a suitable disk 10 carrying facing material 11 after the usual manner. This driven member is arranged to drive the shaft 3 and this is done advantageously through an overrunning clutch. A hub 12 may be connected to the driven shaft as by means of a spline connection, the hub having a central rib like portion 13, and the disk 10 may be connected to a ring like member 14 overlying the rib-like member 13. The disk may be connected to the member 14 as by means of rivets or the like 15 and the inner edge of the disk 10 may overlap the rib 13 as shown at 16, while a separate ring as at 17 may lap the other side of the rib 13. This rib 13 may be formed with recesses such as shown in Fig. 2 for the reception of driving rollers 20, which may be backed up by spring pressed plungers or the like at 21. This constitutes an overrunning drive connection or clutch, the form of which may vary and which clutches are known to those versed in the art. It will be appreciated that the ring 14 in rotating counter-clockwise as Fig. 2 is viewed will impart rotation to the shaft 3, as the roller 20 is jammed in between the inner peripheral surface of the ring 14 and bottom of the recess, which bottom (as shown at 22) is disposed to produce a narrowing space between itself and ring 14 into which the roller is jammed. The shaft 3, however, with its hub may rotate counter-clockwise faster than the ring 14, as this action tends to release the roller 20.

The driven disk is designed to be packed into clutch engagement by centrifugal action. For this purpose centrifugal elements are provided; such an element is illustrated at 25 (see Fig. 2) and may be segmental in form, and a plurality of such segmental centrifugal members may be provided as illustrated. Each centrifugal element is preferably associated in driving relation with the flywheel and for this purpose they may be directly connected to the cover plate. To this end the cover plate may have ribs 26 and may each have centrifugal weight slots 27 with the slots and ribs cooperating in interfitting relation. Weights 25 may move radially outwardly and inwardly on the ribs 26.

Advantageously each weight may have two slots, as shown in Fig. 3, and between the slots substantially centrally of the weight the same is provided with a recess 29 which may be of inverted cone shape. Carried by the cover plate are devices for cooperation with the centrifugal weights and as shown herein, such devices take the form of studs 30, one for each centrifugal weight, and each having a conical head 31 for fitting into a recess 29. These studs may be screw threaded into the cover plate, as shown in Fig. 1, and then held by a lock nut 32.

As shown in Fig. 1, the weights are positioned radially inward, in inoperative position, and means are provided for so holding the weights. Such means may take the form of studs 35 screw threaded into the weights advantageously one adjacent each edge of a weight. The cover plate is provided with an aperture 36 for each stud which may be elongated as shown to permit the stud therein to move radially. A coil spring 37 may surround each stud, the same seating against the cover plate which may be counterbored, as at 38, for such purpose, and against a retainer 39 near the end of the stud. In normal inoperative position the studs 35 are preferably off center as regards the openings 36 so that they may have sufficient movement radially outward. This will be considered more in detail later on.

A secondary clutch may be provided between the driving members and driven shaft 3. This may take the form of a cone clutch comprising a shiftable member 40 splined to the shaft 3, having facing material 41 for engaging with conical surface 42 in the cover plate 6. The secondary clutch may be held normally disengaged by the coil spring 43 acting on the member 40 and backed up by a retainer 44 held by a securing ring 45 in the driven shaft. A clutch pedal is illustrated at 46 designed to rock shaft 47 and this shaft carries arms 48 which engage with a clutch control member 49 axially shiftable upon a housing part 50. When the clutch pedal is depressed the arms 48 urge the control element 49 axially from right to left, as Fig. 1 is viewed; this in turn engages and shifts member 40 to establish a direct clutching engagement between the flywheel and driven shaft.

In describing the operation of the structure it is thought that the use of a diagram such as illustrated in Fig. 5 will be helpful. This diagram shows curves indicating effective clutch packing pressure at different speeds of rotation, calculated on a total of six segments, or centrifugal weights, having a total weight of about 8.75 pounds and working on an effective angle or wedge of about 34°; that is to say, the angle of the conical surface of the studs 30 is about 56° relative to the axis and 34° relative to a perpendicular to the axis. The center curve C is illustrative of an uncontrolled centrifugal clutch. At a point just under 500 R. P. M., for example, engagement may start, and the packing pressure increases with increase of R. P. M. Upon deceleration the packing pressure decreases on the same curve. Let it be assumed that an effective packing pressure of 1300 pounds is required to hold the maximum power out-put. The curve C crosses the line GF, which is at 1300 pounds, when the R. P. M. is about 1060. Thus it will become apparent that at speeds less than 1060 R. P. M. the power which the engine may develop may cause clutch slippage. This isn't so important in the starting of a vehicle and getting it under way, as it is in deceleration; if for example, an automobile has been operating over a highway and a long uphill grade is encountered the engine may be pulling hard at a R. P. M. less than 1060 R. P. M., say for example 960; the effective packing pressure at this time is only about 970 pounds and the clutch may slip.

Now considering the curve A; this illustrates the effective packing pressure during acceleration of the engine with the present clutch. Initial engagement may occur slightly below 500 R. P. M. and the friction required to increase the same retards the packing pressure so that the desired effective pressure of 1300 pounds is not reached until the R. P. M. has risen to 1200. At 2000 R. P. M. effective packing pressure may be 4000 pounds. Obviously, any packing pressure in excess of 1300 is more than adequate Assume now that the engine and clutch start decelerating. The effective centrifugal force decreases but the centrifugal clutch members immediately meet with friction which must be overcome before the effective packing pressure may be reduced. Accordingly, as illustrated, the R. P. M. may reduce from 2000 to about 1530 before the effective packing pressure reduces. In other words, the packing pressure at the speeds mentioned remain constant from D to E whereupon the effective packing pressure upon further deceleration is illustrated by the curve B. Accordingly, the desired 1300 pounds packing pressure is effective as shown by the diagram at a R. P. M. as low as about 960. Any horizontal line connecting curves A and B represents the possible drop in motor speed before there is any drop in clutch torque capacity. Accordingly, when a vehicle goes into a hard pull and is decelerated the effective packing pressure is maintained higher than it would be where the centrifugal elements are unconstrained, and this because of the controlling or constraining frictional action.

This gives the mechanism a range of R. P. M. through which a given torque capacity may be maintained. The curve C represents no range as the packing pressure follows this curve upon acceleration and deceleration. The curves A and B illustrate packing pressure upon acceleration and deceleration respectively, and the range provided is represented by the distance between these curves on any horizontal line.

The above is given as exemplary only, it being understood that the invention is not limited to this example, as conditions would vary with a variation of controlling factors in the structure. For example, the coefficient of friction between the segments and the facing material is one factor; the weight of the centrifugal elements is another; the angularity of the wedge or conical studs is another. It may be pointed out that, as shown in Fig. 1, the effective angularity of the conical heads is about 34° which gives a mechanical advantage of about 1 to 1.48. This angularity may be varied as desired. The angular range may be from about 15° to 45°. Inasmuch as the centrifugal weights are carried on the driving member it is preferred that the arrangement be such that the clutch engagement does not start until a relatively high R. P. M. is developed, say somewhere between 500 and 600 to permit of a relatively fast idling of the engine to keep it running when the same is cold. The above chart is based upon a return spring pressure of about 300 pounds total; that is to say, a force of 300 pounds is required to shift the weights from at-rest position, to initial engagement. This is also subject to variation.

In operating a vehicle equipped with this clutch one needs but to actuate the engine throttle to accelerate the same with the clutch automatically engaging at requisite R. P. M.; then the vehicle gets under way. To shift the gears the engine may be decelerated by throttle actuation, at which time the driven parts, including driven shaft 3, may overrun the engine, and gear shift may be made; then the throttle may again be actuated to accelerate the engine. In ordinary usage there is no occasion for actuation of a clutch pedal. In the event it is desired to directly connect the engine and driven shaft to prevent the overrunning action, the operator may merely depress the clutch pedal 46 and engage the cone clutch. Thus the engine compression may be utilized to decelerate the vehicle. Also the cone clutch may be used where it is found necessary to start the engine by the movement of the vehicle.

The fact that the clutch engagement is retarded during acceleration, to the end that full engagement, or what may be termed full engagement, at 1300 pounds is not reached until about 1200 R. P. M. is not particularly disadvantageous because in starting a vehicle at these relatively low speeds the vehicle is ordinarily operating at low torque capacity. It is when the vehicle is decelerated on a hard pull, as for example, when it is going up a hill that the retarding or lag of the effective torque capacity carries the full clutch engagement over to a relatively low R. P. M.

In the modified form shown in Fig. 4, the parts are the same as in the form heretofore described and the same reference characters are applied. However, the engaging surfaces of the driven disk and centrifugal members are disposed at an angle to a plane perpendicular to the axis as shown. Upon deceleration of this form of the invention, the retarding action is increased because the weights tend to move radially inwardly and work against the angle as well as overcoming the friction. This angle would also have a tendency to lessen the retarding of the packing pressure during acceleration as the weights move outwardly with the angle.

I claim:

1. A clutch comprising in combination, a flywheel, a cover plate, ribs on the cover plate, segmental weights slidable upon the ribs, each weight having a conical recess, studs carried by the cover plate having conical heads cooperating with said recesses, spring means serving to keep said recesses seated upon said conical heads of the studs, a driven disk between the flywheel and said weights, said conical heads shifting the weights axially into engagement with the disk as said weights shift axially outward incident to centrifugal action.

2. The combination of a clutch driving member, a clutch driven member, a driven shaft, centrifugally controlled clutching elements carried by the driving member for engaging the driven member to establish a drive connection, an overrunning clutch between the clutch driven member and driven shaft, a driven member of a secondary clutch positively connected to the shaft, and means for effecting a clutching engagement between said last named driven member and said clutch driving member.

3. The combination of a clutch driving member, a driven shaft, a clutch driven member, an overrunning drive connection between said clutch driven member and the driven shaft, a second clutch driven member positively connected to the shaft, centrifugal means carried by the driving member adapted to effect clutching engagement with the first mentioned clutch driven member by centrifugal action, and operator controlled means for establishing a drive connection between said second named clutch driven member and said clutch driving member.

4. The combination of a clutch driving member, a driven shaft, a clutch driven member, an overrunning drive connection between said clutch driven member and the driven shaft, a second clutch driven member positively connected to the shaft, centrifugal means carried by the driving member adapted to effect clutching engagement with the first mentioned clutch driven member by centrifugal action, and operator controlled means for establishing a drive connection between said second named clutch driven member and said clutch driving member, said second named clutch driven member having a frusto-conical shaped friction surface, and said driving member having a frusto-conically shaped recess for engagement with the same.

5. A clutch comprising in combination a driving member, a driven disk, centrifugally controlled clutching elements carried by the driving member, means for shifting said elements axially as said elements shift radially outwardly under centrifugal force for effecting clutching action, said elements and driven disk having frictionally engaging surfaces disposed at an angle to the normal plane of rotation of a driven disk with said surface of the driven disk sloping radially outward and away from said element, and said surface on said elements substantially paralleling the same.

6. In a clutch, the combination of a driving member having centrifugally controlled clutching elements, a driven member, said elements being adapted to effect clutching engagement with the driven member as they move radially outwardly incident to centrifugal force, means for shifting the elements axially into engagement with the driven disk as they shift outwardly, the arrangement of the engaging surfaces of the driven disk and elements being such that the work necessary to effect slippage therebetween by relative radial movement is greater upon movement of the centrifugal elements radially inward than upon movement of the centrifugal elements radially outward.

ERNEST E. WEMP.